United States Patent [19]

Straub

[11] 4,068,903

[45] Jan. 17, 1978

[54] ADAPTIVE SKID DETECTOR THRESHOLD APPARATUS

[75] Inventor: Henrik H. Straub, Mercer Island, Wash.

[73] Assignee: The United States of America as represented by the Secretary of the Air Force, Washington, D.C.

[21] Appl. No.: 748,579

[22] Filed: Dec. 8, 1976

[51] Int. Cl.² .............................................. B60T 8/093
[52] U.S. Cl. ....................................... 303/99; 303/93; 303/107; 244/111
[58] Field of Search .................... 188/181 A; 137/814, 137/825, 826, 827, 831; 235/200 PF, 201 PF; 244/111; 303/91–111, 20

[56] References Cited

U.S. PATENT DOCUMENTS

| 3,576,351 | 4/1971 | Collins | 303/97 X |
|---|---|---|---|
| 3,604,761 | 9/1971 | Okamoto et al. | 303/105 X |
| 3,606,490 | 9/1971 | Ando | 303/97 |
| 3,638,856 | 2/1972 | Dressler, Jr. | 303/96 X |
| 3,652,133 | 3/1972 | Yamazaki et al. | 303/97 |
| 3,711,163 | 1/1973 | Booher | 303/93 |
| 3,856,365 | 12/1974 | Steigerwald et al. | 303/93 |

Primary Examiner—Stephen G. Kunin
Attorney, Agent, or Firm—Joseph E. Rusz; William Stepanishen

[57] ABSTRACT

A skid detector apparatus utilizing a threshold modulator unit to provide an antiskid valve command signal which is inversely proportional to braking pressure to eliminate wheel lockup in accordance with the existing state of a runway. The threshold level modulator utilizes a feedback control signal to vary the threshold level within the skid detector. The skid detector provides a control signal to the valve driver which in turn varies the brake pressure to the braking device.

3 Claims, 2 Drawing Figures

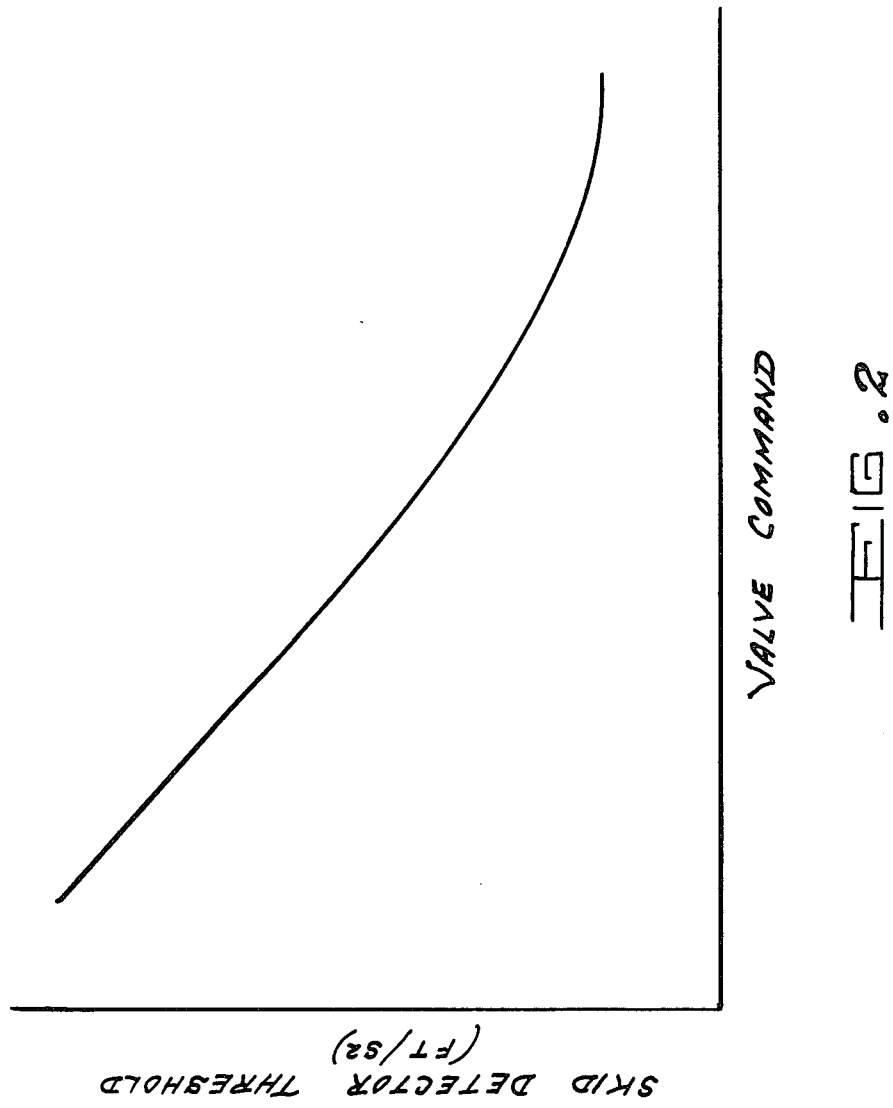

ADAPTIVE SKID DETECTOR THRESHOLD APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to an antiskid system, and in particular to an adaptive skid detector threshold apparatus for antiskid circuits.

At the present time, the conditions under which an aircraft may land are considerably more severe than has been possible in the past. This is largely due to the rapid and great advances that have been achieved in the state of the art for all-weather landing systems. The achievements, however, have created the need for a reliable means to effectively control the stopping of a variety of size aircraft under a host of varying severe runway conditions. Thus, it is plain that some form of antiskid system is required to insure a high level of safety in aircraft landing operations.

A shortcoming of the prior art antiskid braking systems has been the fixed deceleration threshold setting in the skid detector. On dry runways, wheel lockup rates will normally occur at a faster rate than under slippery conditions, thus requiring that the skid detector threshold be set to a compromise wheel deceleration rate between the extremes of operating conditions which are encountered. As a result, some braking performance is lost because deeper wheel skids are encountered on slippery runways.

The present invention is an improvement over an antiskid circuit of the type as proposed in the patent application of Henrik H. Straub, Ser. No. 566,158 for a fluidic antiskid circuit, now U.S. Pat. No. 3,985,398 issued Oct. 12, 1976.

SUMMARY

The present invention utilizes a feedback signal derived from the brake valve driver in an antiskid circuit to modulate the threshold level of the skid detector to prevent wheel lockup. An antiskid threshold level modulator is positioned in a feedback loop from the valve driver to the skid detector to provide an antiskid valve command signal which is inversely proportional to the required brake pressure. The threshold level modulator varies the threshold level within the skid detector to vary the signal to the valve driver which in turn varies the brake pressure to the braking device.

It is one object of the present invention, therefore, to provide a new and improved skid detector threshold apparatus.

It is another object of the invention to provide an improved skid detector apparatus that functions in a wide range of severe environments.

It is a further object of the invention to provide an improved skid detector apparatus that provides the maximum antiskid braking pressure at the braking device.

It is still a further object of the invention to provide an improved skid detector apparatus antiskid that will provide increased reliability of operation in severe weather conditions than those known in the art.

These and other advantages, objects and features of the invention will become more apparent from the following description taken in connection with the illstrative embodiment in the accompanying drawings.

DESCRIPTION OF THE PREFERRED EMBODIMENT

Figure 1:
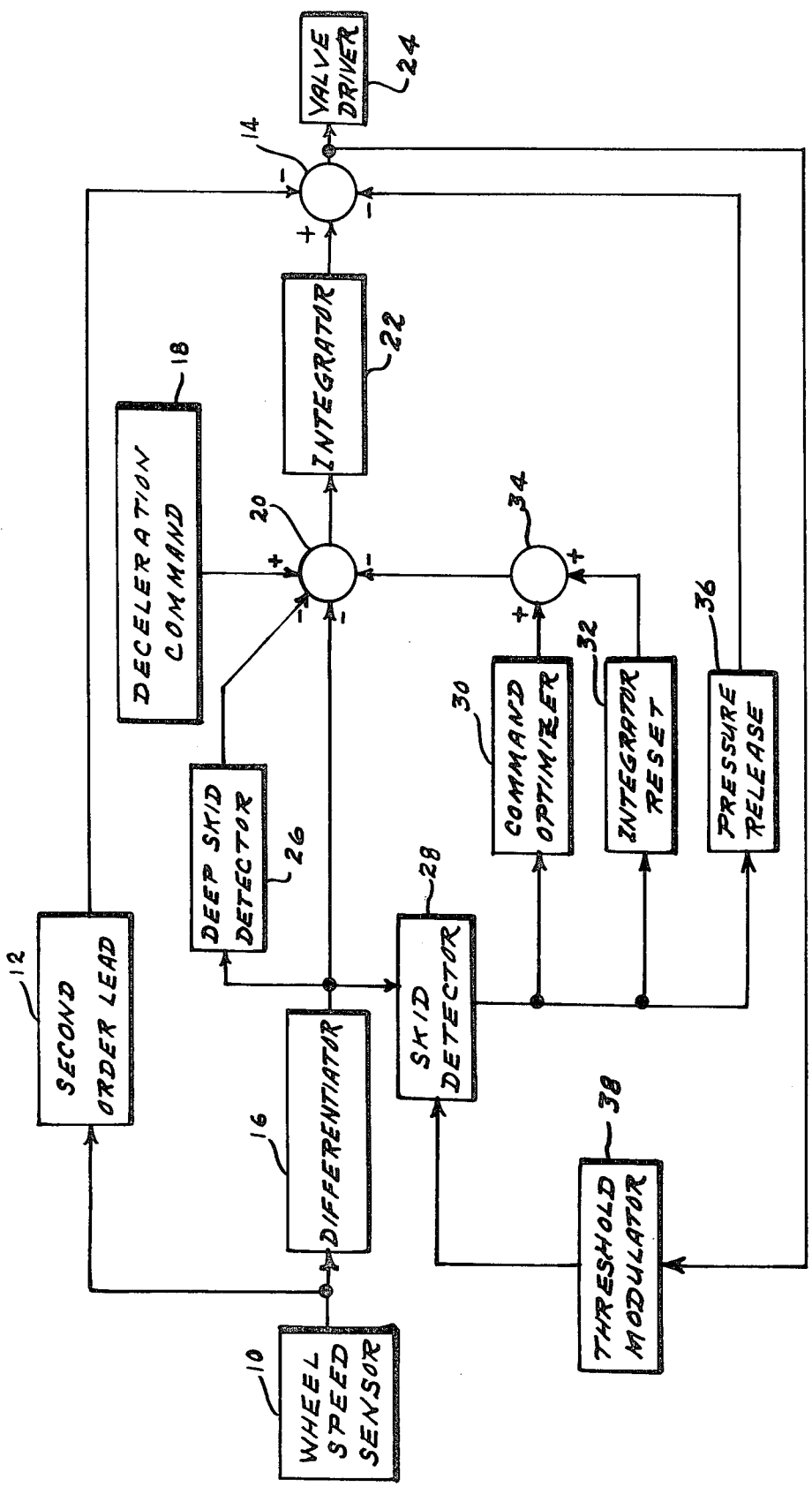
FIG. 1 is a block diagram of the adaptive skid detector threshold apparatus in accordance with the present invention, and, FIG. 2 is a graphical representation of the skid detector threshold level with respect to the brake pressure valve command signal.

Referring now to FIG. 1, there is shown a pneumatic wheel speed sensor unit 10 which provides a pulse signal that is proportional to the wheel speed. The pulse signal which is converted to a DC signal in the speed sensor unit 10, is applied to differentiator 16 where the signal is differentiated to provide a wheel deceleration signal for computation purposes. The actual wheel speed deceleration is compared to a command deceleration signal from unit 18 in the summing unit 20. The resulting error signal from summary unit 20 drives the integrator unit 22, summing unit 14 and the valve driver unit 24 to modulate the brake pressure valve command signal to the valve driver unit 24.

During a braking operation, should wheel deceleration become excessive, a deep skid detector unit 26, which is a digital amplifier, is switched into the integrator unit 22 to provide a rapid decrease in brake pressure signal thereby keeping the skid at a minimum level. Two digital amplifiers are provided to be switched in at different wheel decelerations. The second digital amplifier is skid detector unit 28 which functions in cooperation with the command optimizer unit 30 and integrator reset unit 32 whose outputs are summed in summing unit 34 and sent to summing unit 20. The pressure release subsystem 36 is connected directly to the summing unit 14 bypassing the integrator unit 22.

A forward-feed circuit for providing the derivative of deceleration is shown as the second order lead 12, and provides damping to protect against undesirable landing gear oscillations. The valve driver unit 24 delivers a signal to an interface valve which converts antiskid signals to corresponding brake pressures. The threshold modulator unit 38 which receives the brake pressure valve command signal from summing unit 14, applies a threshold control signal to skid detector unit 28. The skid detector unit 28 utilizes the threshold control signal to modify the braking command signal and thus provide maximum braking power with minimum wheel skid.

Turning now to FIG. 2, there is shown a graphical representation of the response of the skid detector threshold level with respect to the brake pressure valve command signal. It may be clearly seen from the graphical representation in FIG. 2 that the antiskid valve signal and the resulting brake pressure are indicative of the runway condition, i.e., high brake pressure for dry and low brake pressure for slippery. The valve command signal is used to modulate the skid detector threshold setting, because the brake pressure is inversely related to the antiskid valve command signal, and the feedback signal must vary in accordance with FIG. 2.

Although the invention has been described with reference to a particular embodiment, it will be understood to those skilled in the art that the invention is capable of a variety of alternative embodiments within the spirit and scope of the appended claims.

What is claimed is:

1. In combination with a fluidic antiskid circuit comprising a pneumatic wheel speed sensor connected to a wheel, means for determining the rate of deceleration of the wheel, means for comparing the rate of deceleration with a preselected rate of deceleration and producing an output signal, valve means connected to the wheel braking system and adapted to receive said output signal, and means for detecting and compensating for excessive wheel deceleration, wherein the improvement comprises:

threshold detector means receiving said output signal from said comparing means, said threshold detector means applying a valve command signal to said detecting and compensating means, said valve command signal varying the threshold level within said detecting and compensating means, said valve command signal is inversely proportional to said output signal.

2. An improved fluidic antiskid circuit as described in claim 1 wherein said threshold level within said detecting and compensating means is varied inversely proportional to said output signal from said comparing means.

3. An improved fluidic antiskid circuit as described in claim 1 wherein said threshold detector means comprises a threshold level modulator unit utilizing said output signal to vary the brake pressure signal in a preselected manner.

* * * * *